United States Patent
Tsuji

(10) Patent No.: US 9,008,622 B2
(45) Date of Patent: Apr. 14, 2015

(54) INFORMATION PROCESSING APPARATUS AND WIRELESS COMMUNICATION MODULE SETTING METHOD

(71) Applicant: Kabushiki Kaisha Toshiba, Tokyo (JP)

(72) Inventor: Tadashi Tsuji, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 91 days.

(21) Appl. No.: 13/746,162

(22) Filed: Jan. 21, 2013

(65) Prior Publication Data

US 2013/0196644 A1 Aug. 1, 2013

(30) Foreign Application Priority Data

Jan. 27, 2012 (JP) ................................. 2012-015025

(51) Int. Cl.
*H04M 1/66* (2006.01)
*H04M 3/00* (2006.01)
*H04W 52/02* (2009.01)

(52) U.S. Cl.
CPC ................................. *H04W 52/0212* (2013.01)

(58) Field of Classification Search
USPC ............... 455/127.1, 411, 410, 418; 370/216; 340/568.1; 726/35
See application file for complete search history.

(56) References Cited

U.S. PATENT DOCUMENTS

| 5,703,598 A * | 12/1997 | Emmons .................. 342/357.75 |
| 6,895,033 B1 * | 5/2005 | Storm et al. .................. 375/130 |
| 2006/0211415 A1 * | 9/2006 | Cassett et al. ................. 455/423 |
| 2008/0191939 A1 * | 8/2008 | Yu et al. .................. 342/357.13 |
| 2010/0241739 A1 * | 9/2010 | Reus et al. ..................... 709/222 |

FOREIGN PATENT DOCUMENTS

| JP | 2008-165553 A | 7/2008 |
| JP | 2008-167381 A | 7/2008 |
| JP | 2009-239661 A | 10/2009 |

OTHER PUBLICATIONS

First Office Action mailed by Japan Patent Office on Apr. 23, 2013 in the corresponding Japanese patent application No. 2012-015025—6 pages.

* cited by examiner

*Primary Examiner* — Daniel Lai
(74) *Attorney, Agent, or Firm* — Knobbe, Martens, Olson & Bear LLP

(57) ABSTRACT

According to one embodiment, an information processing apparatus includes a wireless communication module including an event notifier, an embedded controller and a setting module. The embedded controller registers event information configured to indicate that supply of electrical power to the wireless communication module was cut in a register and turns on the apparatus, when the embedded controller is started or reset. The setting module sets the wireless communication module to enable the event notifier, if the event information is registered in the register of the embedded controller when the apparatus is turned on.

8 Claims, 3 Drawing Sheets

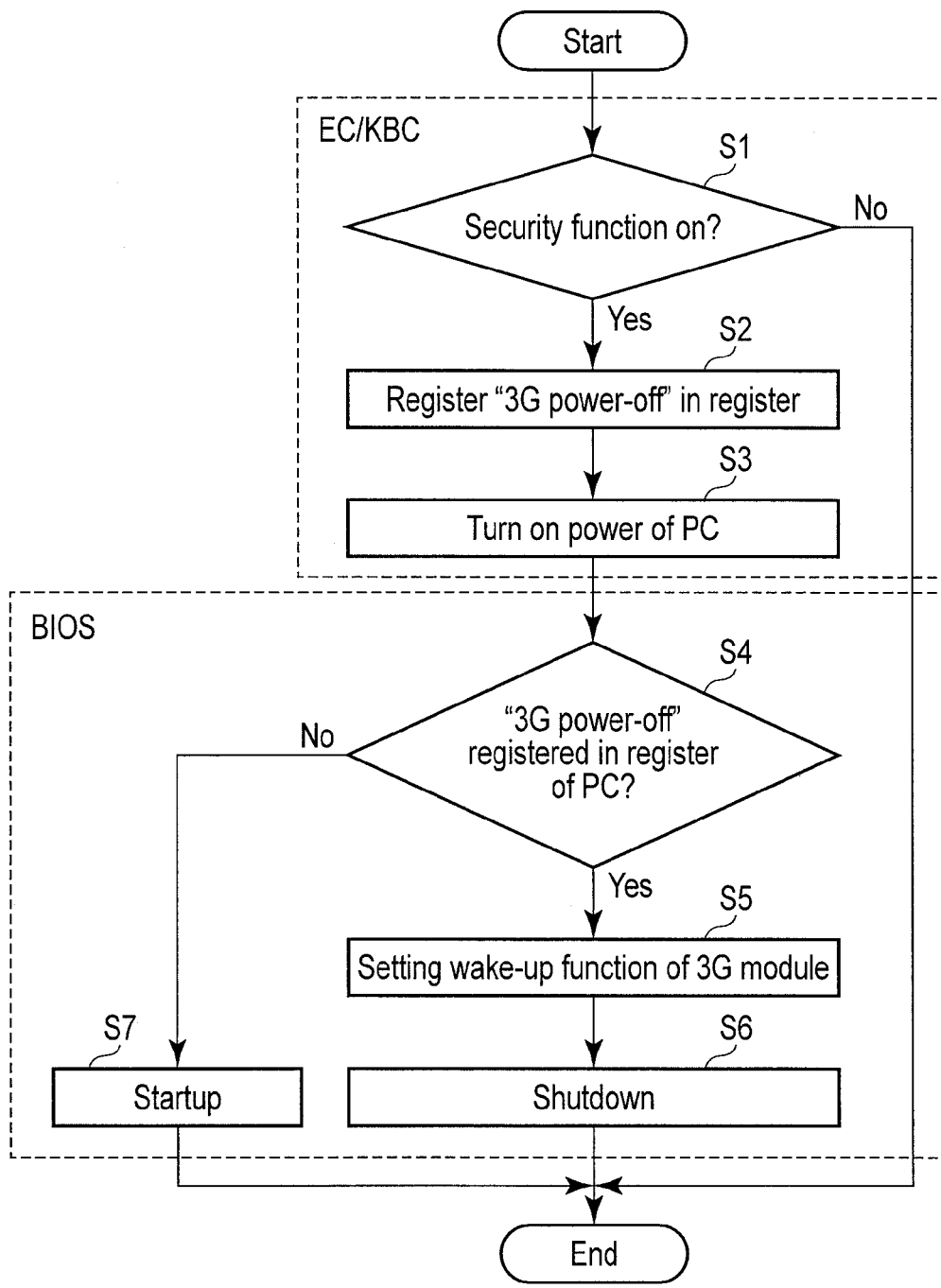
F I G. 4

INFORMATION PROCESSING APPARATUS AND WIRELESS COMMUNICATION MODULE SETTING METHOD

CROSS-REFERENCE TO RELATED APPLICATIONS

This application is based upon and claims the benefit of priority from Japanese Patent Application No. 2012-015025, filed Jan. 27, 2012, the entire contents of which are incorporated herein by reference.

FIELD

Embodiments described herein relate generally to a technique of setting a wireless communication module to maintain, for example, a wakeup function of a 3G module in an enabled state.

BACKGROUND

In recent years, information processing apparatuses which can be driven by a battery and are easily portable have been widespread. The characteristic "driven by a battery and easily portable" enables the user to browse information such as information open to the public on a Web site and transmit/receive e-mails, even when the user is out or traveling, by using such an information processing apparatus.

On the other hand, the characteristic increases the possibility that the apparatuses are lost or stolen (in comparison with desktop information processing apparatuses). There are many cases where the information processing apparatuses store confidential information. Therefore, various proposals for maintaining confidentiality in the case where information processing apparatuses are lost or stolen have been made.

Recently, it is becoming normal for information processing apparatuses to be equipped with a wireless communication function. By using the wireless communication function, there is a method of operating a security function of the information processing apparatus from a remote location, such as disabling the keyboard to lock the information processing apparatus, and deleting data which is stored on a hard disk drive (HDD) or the like in the information processing apparatus, when the information processing apparatus is lost or stolen.

In the meantime, it is required that the security function is operable even when the information processing apparatus is in a power-off state. Therefore, the wireless communication module which provides the wireless communication function is required to be always in a power-on state even while the information processing apparatus is in the power-off state. In addition, it is required that the wireless communication module is set such that the wireless communication module generates an event for changing the information processing apparatus to a power-on state (to operate the security function), when the wireless communication module receives a message of requesting operation of the security function in the case where the information processing apparatus is in the power-off state. This function is referred to as "wake-up function" hereinafter.

This setting is performed by, for example, a Basic Input/Output System (BIOS). The wireless communication module which is always in a power-on state maintains the setting even when the information processing apparatus is changed to the power-off state.

However, when the battery has run out or is disconnected in a state where the AC adapter is not connected, power to the wireless communication module is cut, and the setting for enabling the wake-up function is lost. Therefore, even when the AC adapter is connected thereafter and the supply of power to the wireless communication module is resumed, the security function cannot be operated from a remote location.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 4 is an exemplary flowchart illustrating a process of setting processing for a 3G module, which is performed by the information processing apparatus according to the embodiment.

DETAILED DESCRIPTION

Various embodiments will be described hereinafter with reference to the accompanying drawings.

In general, according to one embodiment, an information processing apparatus includes a wireless communication module, an embedded controller and a setting module. The wireless communication module includes an event notifier configured to output an event signal to notify reception of a message when the message is received. The embedded controller is configured to control supply of electrical power to modules in the apparatus including the wireless communication module. The embedded controller is configured to register event information in a register and turn on the apparatus, when the embedded controller is started or reset. The event information is configured to indicate that supply of electrical power to the wireless communication module was cut. The setting module is configured to set the wireless communication module to enable the event notifier, if the event information is registered in the register of the embedded controller when the apparatus is turned on.

Figure 1:
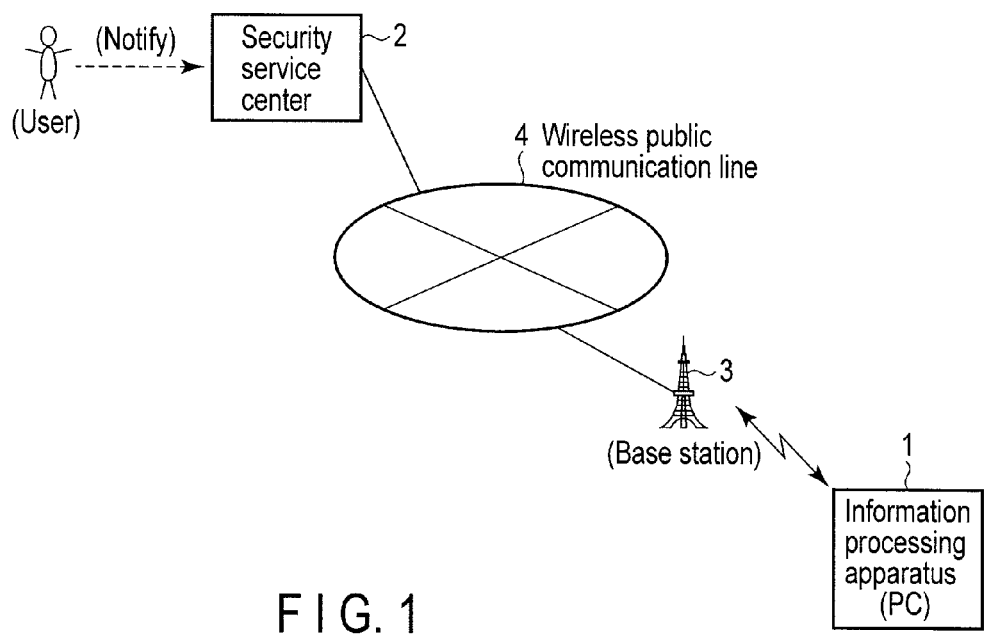
FIG. 1 is an exemplary diagram for explaining an outline of a security function of an information processing apparatus according to an embodiment.

FIG. 1 is an exemplary diagram for explaining an outline of a security function of an information processing apparatus 1 according to the present embodiment.

The information processing apparatus 1 is realized as a personal computer (PC), which can be powered by a battery and is easily portable, such as a notebook computer. The information processing apparatus 1 is equipped with a 3G module configured to receive Short Message Service (SMS) mails which are transmitted from a security service center 2 through a wireless public communication line 4. The 3G module is a module which performs wireless communication between the information processing apparatus and a base station 3 which takes a mobile station (such as a mobile phone) in the wireless public communication line 4, by a method compliant with IMT-2000, which is a standard for the third-generation mobile phone service. A subscriber identity module (SIM) which stores a telephone number and the like is incorporated in the 3G module.

When the information processing apparatus 1 is lost, the user of the information processing apparatus 1 notifies the security service center 2 thereof. In the security service center 2 which is informed thereof, an operator or the like transmits a predetermined SMS mail (for instructing the information processing apparatus 1 to operate the security function) to the telephone number which is stored in the SIM that is incorporated in the 3G module of the information processing apparatus 1. When the 3G module receives the SMS mail, the information processing apparatus 1 executes processing for maintaining security, such as locking the information processing apparatus 1 to prevent key inputs, and deleting data stored in the HDD.

Figure 2:
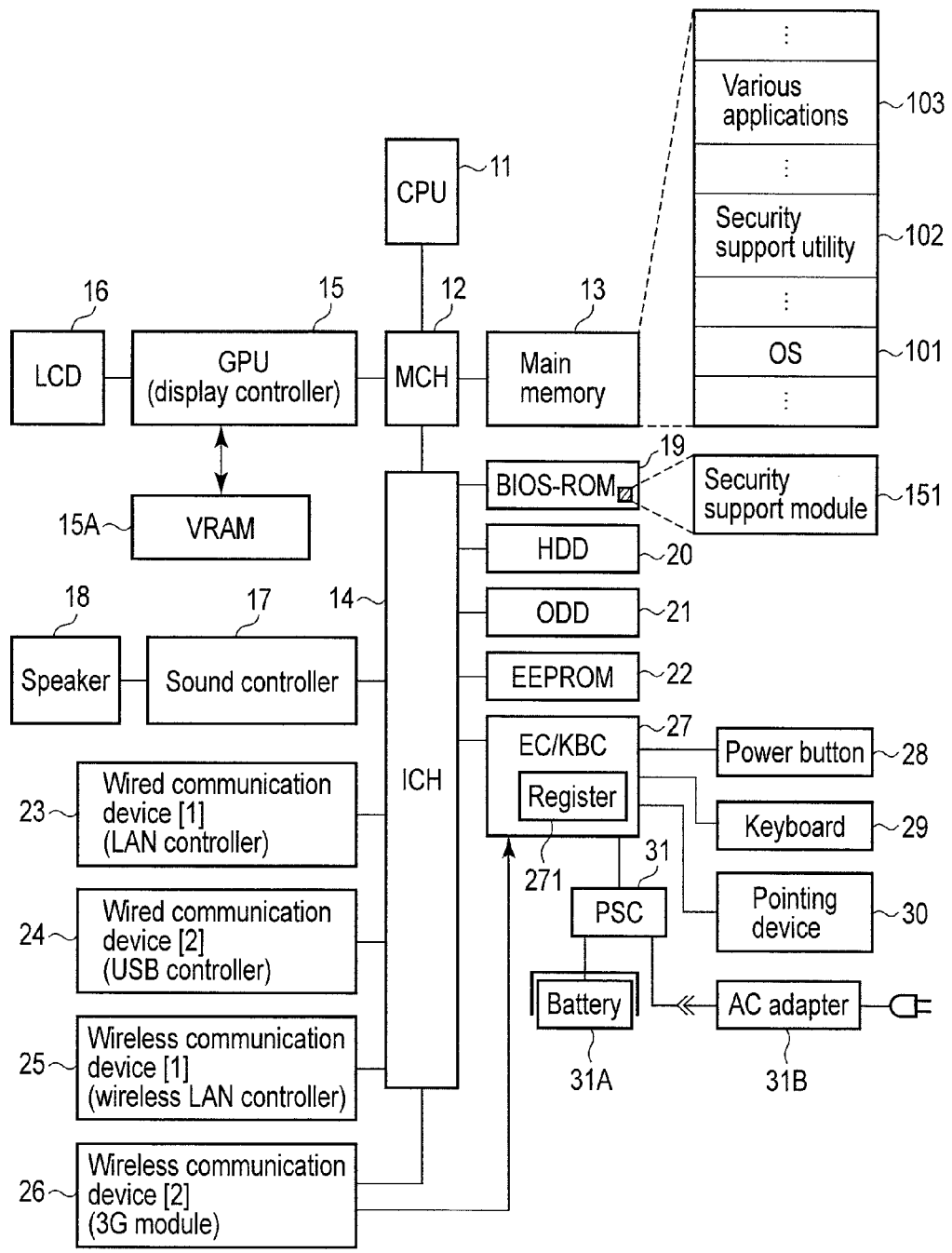
FIG. 2 is an exemplary diagram illustrating a system configuration of the information processing apparatus according to the embodiment.

FIG. 2 is an exemplary block diagram illustrating a system configuration of the information processing apparatus 1.

As illustrated in FIG. 2, the information processing apparatus 1 includes a central processing unit (CPU) 1, a memory controller hub (MCH) 12, a main memory 13, an input/output controller hub (ICH) 14, a graphics processing unit (GPU) 15, a video random access memory (VRAM) 15A, a liquid crystal display (LCD) 16, a sound controller 17, a speaker 18, a Basic Input/Output System read-only memory (BIOS-ROM) 19, a hard disk drive (HDD) 20, an optical disk drive (ODD) 21, an electrically erasable programmable read-only memory (EEPROM) 22, wired communication devices 23 and 24, wireless communication devices 25 and 26, an embedded controller/keyboard controller (EC/KBC) 27, a power button 28, a keyboard 29, a pointing device 30, and a power supply controller (PSC) 31.

The CPU 11 is a processor which controls operation of the information processing apparatus 1. The CPU 11 loads various programs from the HDD 20 and the ODD 21 into the main memory 13 and executes the programs, and thereby makes the information processing apparatus 1 function as various means. The various programs which are executed by the CPU 11 include an operating system (OS) 101 which performs resource management, and various application programs 103 which operate under the OS 101. In addition, in the information processing apparatus 1, a security support utility program 102 described later operates as a resident program under the OS 101 (like the various application programs 103). The CPU 11 also executes a BIOS which is stored in the BIOS-ROM 19. The BIOS is a program for hardware control. The BIOS includes a security support module 151 described later. The EEPROM 22 is a memory device which is mounted to store, for example, identification information of the information processing apparatus 1.

The MCH 12 operates as a bridge which connects the CPU 11 with the ICH 14, and as a memory controller which controls access to the main memory 13. The MCH 12 also includes a function of communicating with the GPU 15.

The GPU 15 is a display controller which controls the LCD 16. The GPU 15 includes a VRAM 15A which is a video memory. The GPU 15 is also equipped with an accelerator that draws an image, which is to be displayed by the various programs, instead of the CPU 11.

The ICH 14 controls the various devices in the information processing apparatus 1. Therefore, the ICH 14 is provided with a function of communicating with the various devices. The ICH 14 also includes an Integrated Device Electronics (IDE) controller configured to control the HDD 20 and the ODD 21.

The sound controller 17 is a sound source device, and outputs audio data to be played back by the various programs to the speaker 18.

The wired communication device [1] 23 is a local area network (LAN) controller which executes communication that conforms to, for example, the IEEE 802.3 standard. The wired communication device [2] 24 is a Universal Serial Bus (USB) controller which executes communication that conforms to, for example, the USB 2.0 standard, with a USB device that is connected via USB.

On the other hand, the wireless communication device [1] 25 is a wireless LAN controller which executes communication that conforms to, for example, the IEEE 802.11 standard. The wireless communication device [2] 26 is the 3G module described above.

The EC/KBC 27 is a single-chip micro processing unit (MPU), which is obtained by integrating an embedded controller configured to perform power control in cooperation with the PSC 31 with a keyboard controller that receives operation of the keyboard 29 and the pointing device 30. Power is always supplied to the EC/KBC 27, and the EC/KBC 27 includes a function of turning the power of the information processing apparatus 1 on or off in response to operation of the power button 28. The EC/KBC 27 is provided with a register 271 configured to register various information items. The PSC 31 provides power, which is supplied from a battery 31A or the external power source that is connected through an AC adapter 31B, to the components of the information processing apparatus 1, based on instructions from the EC/KBC 27. The PSC 31 includes a function of charging the battery 31A.

Next, it will be explained how the information processing apparatus 1 having the above system configuration achieves the security function, the outline of which has been explained with reference to FIG. 1.

First, suppose that the 3G module 26 receives an SMS mail for instructing the information processing apparatus 1 to operate the security function, when the information processing apparatus 1 is in the power-on state.

When the 3G module 26 receives the SMS mail, the 3G module 26 generates an interrupt for the CPU 11. By the interrupt, the CPU 11 recognizes that the 3G module 26 has received the SMS mail, and transfers the SMS mail that has been received by the 3G module 26 to the security support utility program 102.

When the security support utility program 102 receives the SMS mail, the security support utility program 102 determines whether the mail is a mail to instruct the information processing apparatus 1 to operate the security function or not, by checking whether predetermined text information exists in the text of the mail. When the security support utility program 102 determines that the mail is a mail to instruct the information processing apparatus 1 to operate the security function, the security support utility program 102 requests the security support module 151 of the BIOS to perform processing for maintaining security, such as instructing the EC/KBC 27 not to receive operation of the keyboard 29 and the pointing device 30, and instructing the HDD 20 to perform initialization. In response to the request, the security support module 151 executes processing for maintaining security. After the processing is finished, the security support module 151 instructs the EC/KBC 27 to turn off the power of the information processing apparatus 1.

Next, suppose that the 3G module 26 receives an SMS mail for instructing the information processing apparatus 1 to operate the security function, when the information processing apparatus 1 is in the power-off state.

The EC/KBC 27 continues the supply of power to the 3G module 26, even while the information processing apparatus 1 is in the power-off state. Therefore, the 3G module 26 can receive an SMS mail even while the information processing apparatus 1 is in the power-off state. When the 3G module 26 receives an SMS mail, the 3G module 26 analyzes the SMS mail in the same manner as the security support utility program 102, and determines whether the mail is a mail of instructing the information processing apparatus 1 to operate the security function or not. When the 3G module 26 determines that the mail is a mail of instructing the information processing apparatus 1 to operate the security function, the 3G module 26 notifies the EC/KBC 27 thereof.

The EC/KBC 27, which has received the notification, turns on the power of the information processing apparatus 1 and registers, in the register 271, information which indicates that the power-on is caused by generation of an event of instructing the information processing apparatus 1 to operate the security function.

As described above, when the 3G module 26 receives the SMS mail, the 3G module 26 generates an interrupt to notify the CPU 11 thereof. When the information processing apparatus 1 is in the power-off state, however, power to the CPU 11 is cut, and thus the CPU 11 cannot process the interrupt. Therefore, the interrupt generated by the 3G module 26 ends in failure. Conversely, when the information processing apparatus 1 is in the power-on state, since the information processing 1 has already been turned on, the EC/KBC 27 ignores notification from the 3G module 26 even when the EC/KBC 27 receives the notification. Therefore, notification from the 3G module 26 to the EC/KBC 27 ends in failure. In other words, the 3G module 26 performs both generation of an interrupt for the CPU 11 and notification to the EC/KBC 27 (including determining whether the mail is a mail of instructing the information processing apparatus 1 to operate the security function) each time when an SMS mail is received, without recognizing whether the information processing apparatus 1 is in the power-on state or the power-off state.

When the information processing apparatus 1 is turned on, the BIOS is started first. The BIOS determines the cause of power-on, with reference to the register 271 of the EC/KBC 27. When the cause is generation of an event that the information processing apparatus 1 is instructed to operate the security function (not operation of the power button 28), the BIOS executes the above processing for maintaining security by the security support module 151. After the processing is finished, the security support module 151 instructs the EC/KBC 27 to turn off the power of the information processing apparatus 1. Therefore, no various programs such as the OS 101 and the security support utility program 102 are started.

As described above, the information processing apparatus 1 achieves operation of the security function in response to an instruction from a remote location, in either of the power-on/power-off states.

In the meantime, for example, when an SMS mail is received while the information processing apparatus 1 is in the power-off state, it is determined whether the mail is a mail of instructing the information processing apparatus 1 to operate the security function. When it is determined that the mail is a mail of instructing the information processing apparatus 1 to operate the security function, it is necessary that setting processing is performed for the 3G module 26 to enable the wake-up function, in order to operate the function (wake-up function) of the 3G module 26 for notifying the EC/KBC 27 thereof. The setting processing is performed by the BIOS, more specifically, the security support module 151. The 3G module 26 which is always in the power-on state maintains the setting even while the information processing apparatus 1 is in the power-off state.

In addition, the BIOS also performs setting processing for the EC/KBC 27 for maintaining power to the 3G module 26, regardless of which of the power-on state and the power-off state the information processing apparatus 1 is in.

Figure 3:
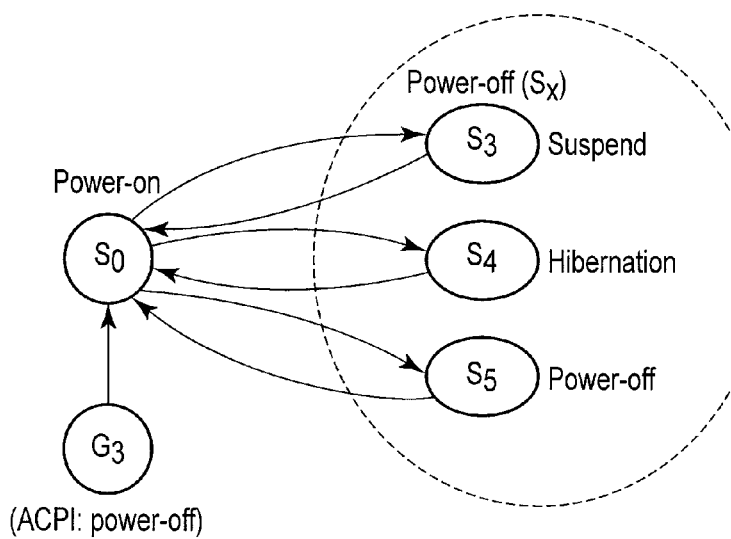
FIG. 3 is an exemplary diagram illustrating state transition of the information processing apparatus according to the embodiment.

FIG. 3 is an exemplary diagram illustrating state transition of the information processing apparatus 1.

As illustrated in FIG. 3, the information processing apparatus 1 can have four statuses, that is, a status $S_0$ which is the power-on state, a status $S_3$ which is a suspend state in which the power of the information processing apparatus 1 is turned off while the state of the information processing apparatus 1 at the time when the information processing apparatus 1 was turned off the last time is maintained in the main memory 13, a status $S_4$ which is a hibernation state in which the power of the information processing apparatus 1 is turned off while the state of the information processing apparatus 1 at the time when the information processing apparatus 1 was turned off the last time is maintained in the HDD 20, and a status $S_5$ which is a complete power-off state. Status $S_3$ to status $S_5$ may be collectively referred to as the status $S_x$, the power-off state. The term "power-off state" in the case where the supply of electrical power to the 3G module 26 is continued even while the information processing apparatus 1 is in the power-off state indicates the status $S_x$.

Separately from the power-off state of the status $S_x$, another power-off state of status $G_3$ is defined in Advanced Configuration and Power Interface (ACPI) specifications. Status $G_3$ is a power-off state in which the power is completely cut since the battery 31A has run out or is detached in the state where the AC adapter 31B is not connected, and the supply of power is resumed by attaching a battery 31A which can supply power (the power-off state continues until the power button 28 is operated). When the power button 28 is operated, the information processing apparatus 1 returns to status $S_0$ which is the power-on state.

When the information processing apparatus 1 is in the power-off state of status $G_3$, it means that the power was completely cut before the information processing apparatus 1 was changed to status $G_3$. Specifically, the power to the EC/KBC 27 which manages power control was cut, and thus power to the 3G module 26 was also cut. Therefore, the setting for enabling the wake-up function in the 3G module 26 is lost. Therefore, even when the information processing apparatus 1 is changed to status $S_0$ or status $S_x$ thereafter, the wake-up function of the 3G module 26 is not operated.

In addition, as described above, it is necessary to perform setting processing for the EC/KBC 27 to continue the supply of power to the 3G module 26 even when the information processing apparatus 1 is in the power-off state. In the state where the setting is lost, the wake-up function of the 3G module 26 is not operated.

Therefore, the information processing apparatus 1 has a structure of automatically recovering the setting for enabling the wake-up function of the 3G module 26, even when the information processing apparatus 1 is changed to the power-off state of status $G_3$. This point will be explained in detail hereinafter.

The causes of changing the information processing apparatus 1 to the power-off state of status $G_3$ are, for example, the following events:

(1) Power from the battery 31A or the external power source through the AC adapter 31B is cut and the supply of power to the EC/KBC 27 is stopped (2) The BIOS which is stored in the BIOS-ROM 19 updated or firmware of the EC/KBC 27 is updated (3) The information processing apparatus 1 shut down since the OS 101 has hung (4) The EC/KBC 27 is reset Among events 1 to 4, above, when event 1 or 3 occurs, the EC/KBC 27 is started thereafter. In addition, event 2 is accompanied by resetting of the EC/KBC 27. When the EC/KBC 27 is started or reset, the EC/KBC 27 registers information, which indicates that power to the 3G module 26 was cut, in the register 271. Then, the EC/KBC 27 turns on the information processing apparatus 1.

When the information processing apparatus 1 is turned on, the BIOS is started first as described above. When the BIOS is started, the BIOS refers to the register 271 of the EC/KBC 27. When the register 271 includes the information which indicates that power to the 3G module 26 was cut, the BIOS determines that the cause of turning on the power of the information processing apparatus 1 is cutting power to the 3G module 26. In this case, the BIOS performs setting processing for the 3G module 26 to enable the wake-up function, by the security support module 151. The BIOS also performs setting processing for the EC/KBC 27 to always continue the supply of power to the 3G module 26. After performing these settings, the BIOS instructs the EC/KBC 27 to turn off the power of the information processing apparatus 1.

Note, when the information processing apparatus 1 is turned on by operation of the power button 28, information which indicates thereof is registered in the register 271 of the EC/KBC 27 (instead of the information which indicates that the power to the 3G module 26 was cut, and which was recorded in the past), and thus the BIOS does not perform setting processing for the 3G module 26 or the EC/KBC 27. In this case, the BIOS does not instruct the EC/KBC 27 to turn off the information processing apparatus 1, but the OS 101 is started.

As described above, the information processing apparatus 1 has a structure of automatically recovering the setting for enabling the wake-up function of the 3G module 26 even when the information processing apparatus 1 is changed to the power-off state of status $G_3$, and thus keeps the wake-up function of the 3G module 26 enabled.

FIG. 4 is an exemplary flowchart illustrating a process of setting processing for the 3G module 26, which is performed by the information processing apparatus 1.

The EC/KBC 27 can permanently maintain information which indicates whether the security function of the information processing apparatus 1 is enabled or disabled, by using, for example, a surplus region of a nonvolatile memory configured to store the firmware. Although the BIOS enables/disables the security function, the interface is concealed from ordinary users.

When the information processing apparatus 1 is changed to the power-off state of status $G_3$ illustrated in FIG. 3 and the EC/KBC 27 is started (including the case where the EC/KBC 27 is reset), the EC/KBC 27 determines whether the security function of the information processing apparatus 1 is enabled or not (Block S1). If the security function is enabled (YES in Block S1), the EC/KBC 27 registers information which indicates that the power to the 3G module 26 was cut ("3G power-off") in the register 271 (Block S2). Then, the EC/KBC 27 turns on the power of the information processing apparatus 1 (Block S3).

When the power of the information processing apparatus 1 is turned on and the BIOS is started, the BIOS determines whether information which indicates that the power to the 3G module 26 was cut ("3G power-off") is registered in the register 271 of the EC/KBC 27 (Block S4). When the information is registered (YES in Block S4), the BIOS performs setting for the 3G module 26 and the EC/KBC 27 for enabling the wake-up function of the 3G module 26 (Block S5). Then, after these settings, the BIOS instructs the EC/KBC 27 to turn off the power of the information processing apparatus 1 (Block S6).

When no information which indicates that the power to the 3G module 26 was cut ("3G power-off") is registered in the register 271 of the EC/KBC 27 when the BIOS is started, the BIOS starts the OS 101 (Block S7).

As described above, according to the information processing apparatus 1, it is achieved that the setting of the 3G module 26 is automatically recovered, even when the power to the 3G module 26 is cut.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus, comprising:
a wireless communicator comprising an event notifier to output an event signal to notify reception of a message when the message is received, the wireless communicator being capable of maintaining a setting for enabling the event notifier while electrical power is supplied;
an embedded controller to control supply of electrical power to components in the apparatus comprising the wireless communicator, wherein the embedded controller registers event information in a register and turns on the apparatus when the embedded controller is started after supply of electrical power to the wireless communicator was cut, or reset to cause cutting of supply of electrical power to the wireless communicator, the event information indicating that supply of electrical power to the wireless communicator was cut; and
a setting controller to set the wireless communicator to enable the event notifier, when the apparatus is turned on and the event information is registered in the register of the embedded controller.

2. The apparatus of claim 1, wherein the setting controller sets the embedded controller to always continue supplying electrical power to the wireless, communicator when the apparatus is turned on and if the event information is registered in the register of the embedded controller.

3. The apparatus of claim 2, wherein the setting controller instructs the embedded controller to turn off the apparatus after the setting controller sets the wireless communicator and the embedded controller.

4. The apparatus of claim 1, wherein the wireless communicator comprises a 3G module which performs wireless communication with a base station that takes a mobile station in a wireless public communication line, by a method compliant with IMT-2000.

5. The apparatus of claim 4, wherein the wireless communicator outputs the event information when a Short Message Service (SMS) mail is received in a state where the event notifier is enabled.

6. The apparatus of claim 1, wherein the setting controller comprises one of modules of a Basic Input/Output System (BIOS).

7. A setting method for an information processing apparatus comprising a wireless communicator comprising an event notifier to output an event signal to notify reception of a message when the message is received, the method comprising:
- registering event information in a register of an embedded controller and turning on the apparatus when the embedded controller is started after supply of electrical power to the wireless communicator was cut, or reset to cause cutting of supply of electrical power to the wireless communicator, the event information indicating that supply of electrical power to the wireless communicator was cut, the embedded controller controlling supply of electrical power to components in the apparatus comprising the wireless communicator; and
- setting the wireless communicator to enable the event notifier when the apparatus is turned on and if the event information is registered in the register of the embedded controller.

8. The method of claim 7, further comprising:
- setting the embedded controller to always continue supplying electrical power to the wireless communicator when the apparatus is turned on and if the event information is registered in the register of the embedded controller.

\* \* \* \* \*